United States Patent Office 3,551,169
Patented Dec. 29, 1970

3,551,169
WAX CREAM PROCESS AND COMPOSITIONS
Paul D. Congdon, Springfield, Pa., assignor to Sun Oil Company, Philadelphia, Pa., a corporation of New Jersey
No Drawing. Continuation-in-part of application Ser. No. 634,880, May 1, 1967. This application July 3, 1969, Ser. No. 839,047
Int. Cl. C08h 9/00; C09f
U.S. Cl. 106—10          4 Claims

ABSTRACT OF THE DISCLOSURE

A process for providing a non-flowable cream wax emulsion composition from a flowable liquid wax-in-water emulsion which comprises making a flowable liquid emulsion of 40 to 75 parts petroleum paraffin wax in water, freezing the liquid emulsion to a solid state and subsequently thawing the frozen emulsion to provide a consistent non-flowable creamy wax emulsion composition.

CROSS REFERENCE TO RELATED APPLICATION

The present application is a continuation-in-part of my copending application Ser. No. 634,880 filed May 1, 1967 now abandoned.

BACKGROUND OF THE INVENTION

The present invention relates to a process for preparing non-flowable emulsified wax cream compositions from a free-flowing liquid wax emulsion without the addition of thickening agents or any other chemical modification of the liquid wax emulsion, and to the creamed wax composition thereby produced.

This invention particularly relates to a process for converting flowable liquid petroleum paraffin wax emulsion compositions into thick, consistent, non-flowable creamy wax emulsion compositions without the addition of any new components to the composition.

Waxes in general, and particularly petroleum waxes, are used in the arts and industries to the extent of hundreds of millions of pounds per year. Two of the better known uses for petroleum waxes lie in wax polishing compositions and in the cosmetic cream industry. Normally wax-based polishes or cosmetics are first prepared in the form of a wax and water emulsion or a wax and oil paste to which other ingredients are later added. The final composition having the wax base is usually a flowable liquid or a thick consistent paste respectively.

Polish as an article can be defined as a liquid or pasty substance for giving smoothness and gloss to the surface to which it is applied and rubbed. Waxes in some form or other are used in almost every type of polish. Generally speaking, a polish has as its foundation a mass of wax which will impart luster to the surface on which it is rubbed. It is customary for the polish manufacturer to combine a hard wax with a less hard, more flexible type wax such as petroleum paraffin wax. Liquid wax polish is normally an aqueous emulsion whereas paste wax polish is normally a combination of wax and oil or solvents. Creamed wax polishing compositions can be of paste variety or can be water emulsions which contain thickening agents such as bentonite clays or soap. However, clays and/or soaps are often undesirable in wax polishing compositions. Thus the use of wax in polishing compositions is more frequently restricted to the flowable liquid emulsion form or as a paste wax. In some instances neither of these forms of wax polish is completely suitable. For example, a single coating of a liquid wax often provides a surface coating which is too thin and conversely a paste wax often provides a surface coating which is too thick. In these circumstances a creamed wax free of clay and soaps having a consistency which is intermediate to the liquid and paste forms is most desirable.

In the cosmetics industry waxes are often used as the base for such compositions as cleansing creams and barrier protective creams. These creams usually contain a proportion of clays, or soap in the composition to provide the creamy consistency required for its particular application. Clays and soaps sometimes cause drying of skin which is an undesirable aspect of this type of composition. A wax-based protective cream or cleansing cream prepared from a flowable wax emulsion free of thickening agents is as yet not generally available in the cosmetics industry.

I have now discovered a process for producing non-flowable creamed wax-in-water emulsions completely devoid of thickening agents.

SUMMARY OF THE INVENTION

The present invention comprises a method for converting a flowable liquid wax emulsion into a thick consistent non-flowable wax cream without changing the chemical make-up of the composition. Specifically, the present invention relates to a process wherein a flowable liquid paraffinic petroleum wax-in-water emulsion is chilled until the emulsion is frozen solid, and preferably to a temperature of at least 0° F., and thereafter the frozen emulsion is thawed. The resulting product surprisingly is a thick consistent non-flowable wax emulsion cream.

DESCRIPTION OF THE INVENTION

A method has now been discovered whereby a thick consistent wax cream can be obtained from a flowable liquid wax emulsion, without the necessity of using oils, hydrocarbon solvents, or thickening agents, such as soaps and clays. That is to say, a method has now been discovered for converting a wax-in-water, flowable liquid emulsion to a non-flowable wax cream without altering the chemical composition of the emulsion. The present invention therefore provides new non-flowable wax-in-water emulsion cream compositions particularly suitable for use as polishing compositions and cosmetics such as skin protective creams and cleansing creams.

Generally, the method of the present invention comprises first preparing a flowable liquid wax-in-water emulsion of 40 to 75 parts of petroleum paraffin wax, 25 to 60 parts of water and an emulsifying amount of a non-ionic or ionic emulsifying agent. To this emulsion is then added other additives required for the particular type of composition being prepared. For example, in the case of leather creams, the coloring components and leather oils, if desired, can be added. In the case of skin creams, lanolin, perfumes, essential oils, or skin oils can be added in the desired quantities. After the addition of the other components to the liquid wax emulsion the entire composition is thoroughly mixed to insure a homogeneous dispersion of the additives. For quicker mixing, the additives are often independently emulsified before being added to the paraffin wax emulsion. The composition is then chilled until the emulsion is frozen solid. The frozen emulsion is subsequently thawed preferably at room temperature to provide a thick consistent non-flowing wax cream.

Petroleum waxes usuable in the process and compositions of the present invention are primarily crystalline or distillate paraffin waxes having melting points in the range of 122° to 160° F. These waxes can be obtained by well-known dewaxing procedures from waxy lubricating oils such as solvent dewaxing with a methyl ethyl ketone-toluene mixture, methyl isobutyl ketones, propane and the like. The precipitated wax crystals are removed by centrifuging or filtering to form slack wax. Slack wax usually contains up to 20 weight percent oil and can be further purified to form scale wax and refined wax which normally contains less than 0.5 weight percent oil. These petroleum paraffinic waxes are well-known articles of commerce.

The wax and water emulsions of the present invention can be prepared with an emulsifying amount of a non-ionic or ionic surface active compound. Usually the amount of emulsifying agent used will be in the range of 1 to 10 parts of emulsifying agent per 100 parts of wax in the composition. The specific amount of emulsifying agent used in the present compositions depends on the concentration of components to be emulsified and can be easily determined without excessive experimentation for each individual composition as required. The preferred compositions of the present invention comprise 40 to 60 parts of paraffin wax and 40 to 60 parts of water. Petroleum oils can be included in quantities up to 50 weight percent of the total paraffin wax in the composition. Paraffinic oils are preferred.

Surface active agents are suitable as a class for use according to the present invention. The nature of surface active agents is well known, and such agents generally have an oleophilic portion of the molecule, usually of hydrocarbon nature, and another, polar portion of the molecule, which may be provided by various functional groups such as hydroxyl, sulfate, carboxyl, carbonyl, amino, nitro, amido, ether, sulfonate, phosphate, phosphite, etc. Examples of suitable classes of surface active agents which can be employed are: alkali metal salts of fatty acids, alkali metal salts of sulfated fatty acids, fatty acid glycerides, sulfonated or sulfated fatty acid esters or amides, alkali metal alkyl sulfates, alkali metal alkyl sulfonates, akali metal aryl sulfonates, alkali metal alkyl-lauryl sulfonates, quaternary ammonium halides, alkali metal salts of alkylated naphthalene, sulfonic acid, polyethylene sorbital esters of fatty acids, fatty acid amides or alkanol amines, condensation products of ethylene oxide and polyalkylene glycols, sorbitan esters, alkyl substituted phosphoric acids, alkali metal salts of alkyl phenol sulfonates, etc. Examples of individual surface active agents which can be employed are given, for example, in Kirk et al., Encyclopedia of Chemical Technology, vol. 13, pages 515–517 (1954).

Particularly suitable surface active agents for use according to the invention are the polyalkyl amines, fatty acid amides, and the polyethylene sorbitol ester of fatty acids, of which numerous examples are given in the Kirk et al. disclosure referred to in the preceding paragraph.

Additives such as oils, vegetable and animal waxes, petroleum microcrystalline waxes, medicants and perfumes which are compatible with the liquid wax emulsion can be added to the emulsion before it is frozen. However, the amount of additives normally should not exceed the amount of paraffin wax in the emulsion if a consistent non-flowable cream is to be obtained.

In some instances in which the desired additives to the liquid wax emulsion which is being prepared for creaming have particularly high melting points, it can be advantageous to first emulsify the additives and subsequently add them in the emulsified form to the liquid paraffin wax emulsion. Only additives which are compatible with paraffin wax-in-water emulsions as described hereinabove should be added to the liquid wax emulsion if the desired creamed wax compositions are to be obtained.

Some of the waxes which can be added to the compositions of the present invention prior to creaming include carnauba, candelilla, esparto, beeswax, spermaceti, petroleum microcrystalline and synthetic waxes. Additives can also include cocoa butter, lanolin, fatty acids, essential oils, including almond, rose, quince and sesame, and preservatives, such as butyl-p-hydroxybenzoate. The creamed wax compositions of the present invention are useful in any application where wax polishing compositions are used, particularly for shoes, furniture, automobiles and other similar applications. The creamed waxes of the present invention are also useful in cosmetics such as skin creams or cleansing creams.

It is well known that aqueous emulsions often break down and separate when subjected to freezing conditions, and normally one would except this result with petroleum paraffin wax-in-water emulsion. Yet, surprisingly, the compositions produced by the process of the present invention are stable wax-in-water emulsions after the freezing process. Further the wax cream recovered by the process of the present invention can be diluted with water to provide a stable liquid free-flowing wax-in-water emulsion. Microscopic examination of the compositions herein described revealed that the creamed wax composition as well as the starting liquid wax-in-water emulsions both have water as the continuous phase which fact precludes any speculation that the creamed wax compositions of the present invention are invert emulsions.

As a further illustration of one mode of the process and compositions of the present invention, the following examples are presented.

Example I

Sixty parts of petroleum paraffin wax characterized as having a melting point of 127° F. AMP, a viscosity at 210° F. of 43.6 SUS and a penetration at 77° F. of 33 (ASTM D1321) was blended at 160° F. with 40 parts distilled water at 160° F. containing 3.5 parts of polyoxyethylene sorbitan monooleate and 3.5 parts of sorbitan monostearate, both of which are emulsifying agents. Five parts of lanolin were also added to the mixture whereafter the mixture was agitated until a stable wax-in-water emulsion was obtained, at which time agitation was curtailed.

The Brookfield viscosity of the emulsion was measured and determined to be 140 cps. The emulsion was chilled in a freezer which was maintained at a temperature of 0° F. until it was frozen solid and was at temperature equilibrium in the freezer. The frozen emulsion was thereafter withdrawn from the freezer and permitted to thaw at 75° F. for a period of 24 hours. The recovered composition was a thick cream which did not flow and which was too thick to permit measurement of the Brookfield viscosity. The cream was easily spread on the surface of leather and provided an attractive waxed surface finish to the article after application and buffing. It could also be spread on human skin and could easily be washed off with water.

Example II

A suitable black boot polishing cream can be prepared by the process of the present invention in the following manner:

Forty parts of a high gloss paraffin petroleum wax characterized as having a melting point of about 145° F., a viscosity at 210° F. of about 40 SUS and a penetration at 77° F. of 9 (ASTM D1321) were blended at 185° F. with 2 parts carnauba wax, 40 parts distilled water, 2 parts of a black coloring agent consisting of m-phenylenediamine substituted diazotized benzidene sometimes referred to as Congo black, 3.5 parts of sorbitan monostearate and 3.5 parts polyoxyethylene sorbitan monooleate. The resulting mixture was agitated until a homogeneous black wax-in-water emulsion was obtained. The Brookfield viscosity of the emulsion was about 126 cps. The emulsion was subsequently chilled in a freezer which was maintained at a temperature of about 0° F. until it was frozen solid and had come to temperature equilibrium in a freezer. The frozen emulsion was thereafter removed from the freezer and permitted to thaw at 75° F. until it was at equilibrium with ambient room temperature. The recovered composition was a thick black wax boot cream which was easily applied to leather surfaces and functioned as an effective polishing wax cream. The wax cream was too thick in consistency to permit measurement of a Brookfield viscosity.

Example III

A paraffin wax-in-water emulsion was prepared in the identical manner disclosed in Example I with the exception that composition contained 35 parts wax and 65 parts water. This composition was frozen and thawed in the identical manner as disclosed in Example I. While thawing, the emulsion broke and separated into a liquid phase and a solid phase and was thereby not usable. This process was repeated with wax-in-water emulsions containing 30 parts wax and 70 parts water as well as an emulsion containing 25 parts wax and 75 parts water. The results after freezing and thawing these compositions were identical. Each of the emulsions broke and were therefore unusable. Thus it is demonstrated, that the limitation of a minimum of 40 parts wax per 100 parts of wax-in-water emulsion is essential to the process and compositions of the present invention.

In the process of the present invention the wax emulsion can be chilled at any temperature below 32° F. for the time necessary to solidify the emulsion. By experimentation it has been discovered that the preferred temperature range for the freezing step of the process of the present invention is from +10° F. to −10° F. The most preferred temperature for the freezing step of the process of the present invention is at about 0° F. The length of time to solidify the emulsion and the temperature at which the emulsion is frozen will of course depend upon the heat exchange ability of the apparatus used in the chilling process. Normally the time of freezing is in the range of 0.25 to 50 hours and preferably 1 to 24 hours. The frozen emulsion can be thawed at any temperature between 32° F. and the melting point of the paraffin wax; however, the temperature of thawing should not be greater than the melting point temperature of the paraffin wax utilized in the emulsion.

I claim:
1. A process for preparing a non-flowable creamed wax from a liquid wax-in-water emulsion without altering the chemical composition of the emulsion which comprises freezing to a solid state a flowable liquid wax-in-water emulsion consisting essentially of (a) 40 to 75 parts petroleum paraffin wax having a melting point in the range of 122° to 160° F. and (b) 25 to 60 parts water and an emulsifying agent and thereafter thawing the frozen emulsion and recovering a thick consistent non-flowing creamed wax composition.
2. The process according to claim 1 wherein said wax-in-water emulsion consists essentially of 40 to 60 parts wax and 40 to 60 parts water.
3. The product of the process of claim 1.
4. The product of the process of claim 2.

References Cited

UNITED STATES PATENTS

| | | | |
|---|---|---|---|
| 2,775,561 | 12/1956 | Frohmader | 252—857X |
| 2,974,106 | 3/1961 | Fronmuller et al. | 106—271X |
| 3,000,753 | 9/1961 | Rockland | 106—271X |

JULIUS FROME, Primary Examiner

JOAN B. EVANS, Assistant Examiner

U.S. Cl. X.R.

106—11, 271, 285; 252—311